(12) United States Patent
Lunt et al.

(10) Patent No.: US 8,781,224 B2
(45) Date of Patent: Jul. 15, 2014

(54) BAND DEPENDENT LINEARIZATION FOR MULTIBAND REMOTELY SENSED AND AERIAL IMAGERY

(75) Inventors: Sharon Lunt, Webster, NY (US); Michael Vaughn, North Chili, NY (US); Stacey Casella, Macedon, NY (US)

(73) Assignee: Exelis Inc., McLean, VA (US)

( * ) Notice: Subject to any disclaimer, the term of this patent is extended or adjusted under 35 U.S.C. 154(b) by 119 days.

(21) Appl. No.: 13/484,056

(22) Filed: May 30, 2012

(65) Prior Publication Data

US 2013/0322751 A1 Dec. 5, 2013

(51) Int. Cl.
*G06K 9/36* (2006.01)
*H04N 1/60* (2006.01)
*G06T 5/50* (2006.01)
*G01J 3/40* (2006.01)

(52) U.S. Cl.
CPC .. *H04N 1/60* (2013.01); *G06T 5/50* (2013.01); *G01J 3/40* (2013.01)
USPC ........................................................ 382/167

(58) Field of Classification Search
None
See application file for complete search history.

(56) References Cited

U.S. PATENT DOCUMENTS

| 7,206,074 B2 * | 4/2007 | Fujimoto et al. ............. 356/456 |
| 2002/0114533 A1 * | 8/2002 | Smith et al. .................. 382/275 |
| 2012/0293801 A1 * | 11/2012 | Kanai et al. ................... 356/402 |

* cited by examiner

*Primary Examiner* — Yon Couso
(74) *Attorney, Agent, or Firm* — Davidson Berquist Jackson & Gowdey, LLP

(57) ABSTRACT

A system for processing a multiband image, including digital computer memory for storing a multiband image having multiple bands of image data; and processing circuitry for processing the multiband image, wherein the processing circuitry (a) determines pixel locations in the bands of the multiband image having values above the band-specific white value threshold for each of the bands of the multiband image, (b) determines a band-specific correction factor for each of plural bands of the multiband image based on the determined pixel locations, and (c) applies the corresponding band-specific correction factor to the respective plural bands of the multiband image to produce a corrected image.

22 Claims, 2 Drawing Sheets

BAND DEPENDENT LINEARIZATION FOR MULTIBAND REMOTELY SENSED AND AERIAL IMAGERY

FIELD OF THE INVENTION

The present invention is directed to an automated method and system for processing multi-band imagery from satellite and/or aerial sources to compensate for varying gains between the multiple bands while stretching the dynamic range of the scene content in view, and, in one embodiment, to an automated method and system for processing multi-band, visible imagery.

DISCUSSION OF THE BACKGROUND

Known systems utilize image processing techniques where a set of statistical functions are applied to an image (e.g., a satellite image) to generate compensation for band-specific gains. One such technique utilizes statistical analysis to determine where a number of the highest values for each of the bands are selected, and those number of values are treated as being indicative of how the gains of the bands are interrelated. However, such a process of determining gains can result in unintended colored shadows or colored highlights. One such reason for this is that in order for neutral objects to be represented correctly in an image, the digital count values at the spatial location (for each channel) representing neutral objects (e.g. clouds, roads, etc) need to be equivalent (e.g., R=G=B). In known techniques, there are no assurances that pixels treated as neutral are actual neutral objects as seen by the human observer. Also, depending on the linearity of the channel and how sensitive the channel is from an exposure perspective, clipping may occur in the highlight regions or shadow regions, in which the processing in current methods could result in severe coloration in the highlight or shadow regions.

BRIEF DESCRIPTION OF THE DRAWINGS

The following description, given with respect to the attached drawings, may be better understood with reference to the non-limiting examples of the drawings, wherein.

DETAILED DESCRIPTION OF THE INVENTION

Figure 1:
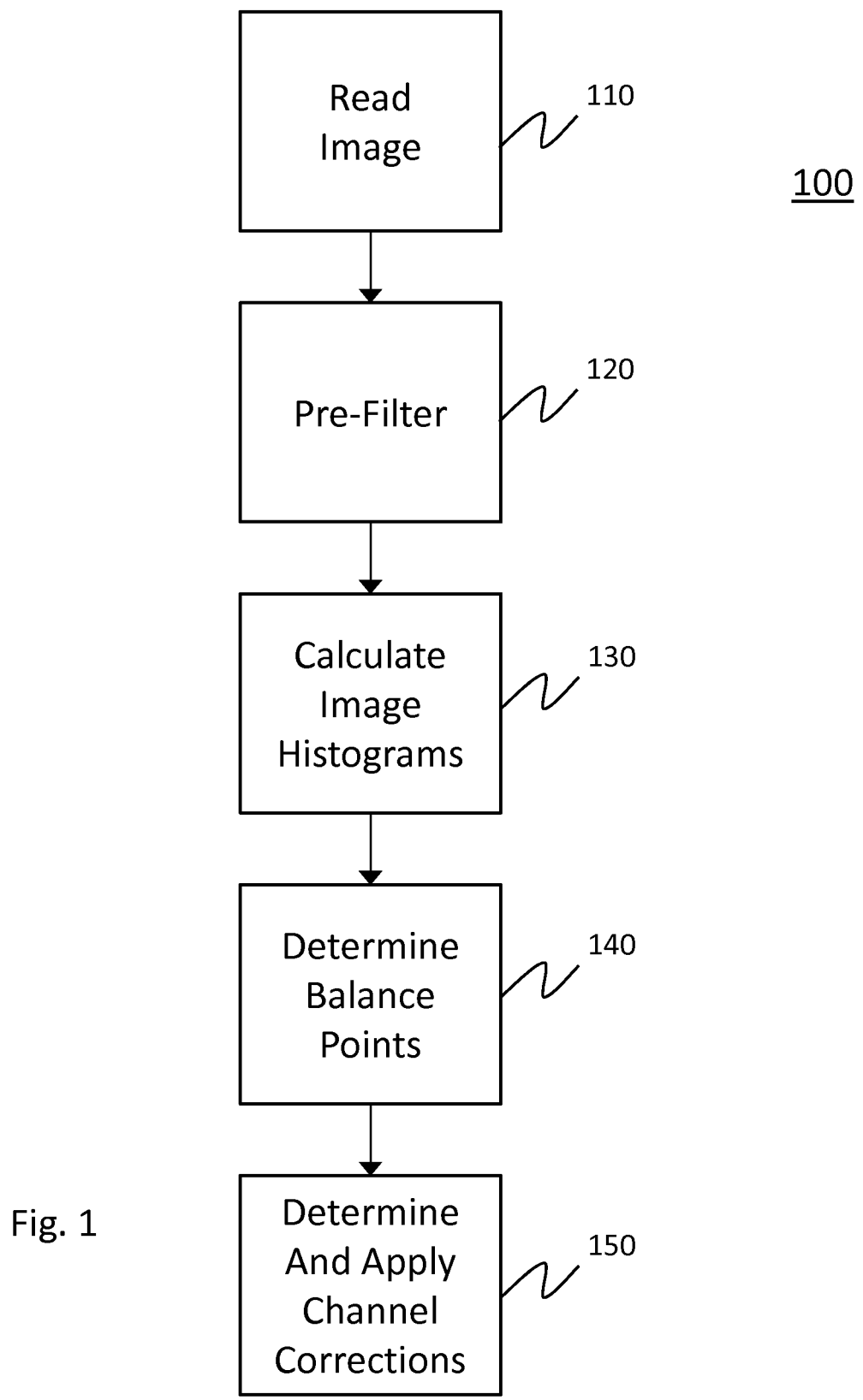
FIG. 1 is a flowchart showing an exemplary method of processing an image to perform band dependent linearization.

As shown in FIG. 1, a series (100) of image processing steps can be performed to provide band dependent linearization of multiband images. In step 110, the method and/or system reads in a multiband image to prepare it for processing. In one embodiment, the image is a satellite or aerial image that is stored in a non-volatile storage device (e.g., a hard disk drive of a storage network). The multi-band image includes visible band combinations such as red/green/blue bands.

In step 120, the system may apply certain pre-filtering techniques on the image, either on a single band or on multiple bands of the image. The pre-filtering techniques may be either band-dependent techniques or band-independent techniques. Exemplary pre-filtering techniques include, but are not limited to: reduction of high frequency noise and/or changing of color spaces to reduce color saturation. In another pre-filtering embodiment, metadata about how the image was captured may either be read from the image itself or from another location (e.g., a database of image capture information). In one such pre-filtering technique, certain parameters (e.g., AbsCalFac and EffBW) are read from the image or from a database and used to create band-specific preliminary corrections factors that are applied to each band separately. For example, for coastal/blue/green/yellow/red images, the AbsCalFac and EffBW information stored with an image may be defined by the following tuples: (0.0093, 0.0473), (0.00729, 0.0543), (0.00971, 0.063), (0.0051, 0.0374) and (0.01852, 0.574), respectively. The ratios of the values of the tuples are then calculated for each band (e.g., 0.0093/0.0473 for coastal), and the band-specific ratio is applied to the image data of the corresponding band of the image. As would be understood by those of ordinary skill in the art, some images may not need pre-filtering, and in such embodiments, the series (100) of steps simply passes from step 110 to step 130.

In step 130, the system calculates band-specific image histograms for each of the pre-filtered bands (or original bands if step 120 was skipped). The histograms are created by counting how many times each digital count value appears in a band. A system default, band-specific maximum and minimum threshold is specified (e.g. 99.9% and 0.1%). Using the histogram, an analysis is performed to identify the number of and spatial location of pixels above/below these thresholds, using the calculated histograms. The thresholds will be referred to herein as the "band-specific white value threshold" and "band-specific black value threshold" respectively.

Figure 2A:
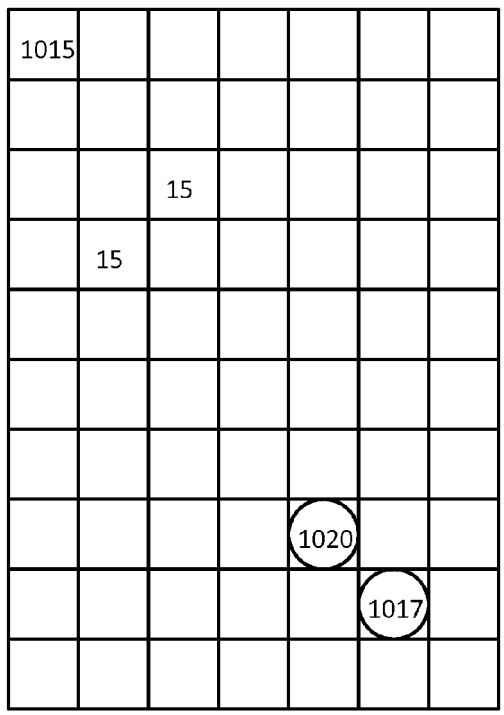
FIGS. 2A-2C are Red, Green and Blue pixels planes from a single corresponding image having three image planes.
Figure 2B:
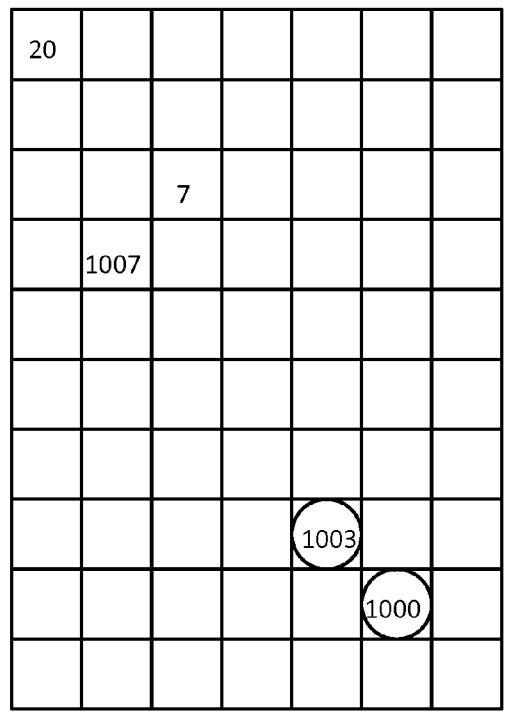
Figure 2C:
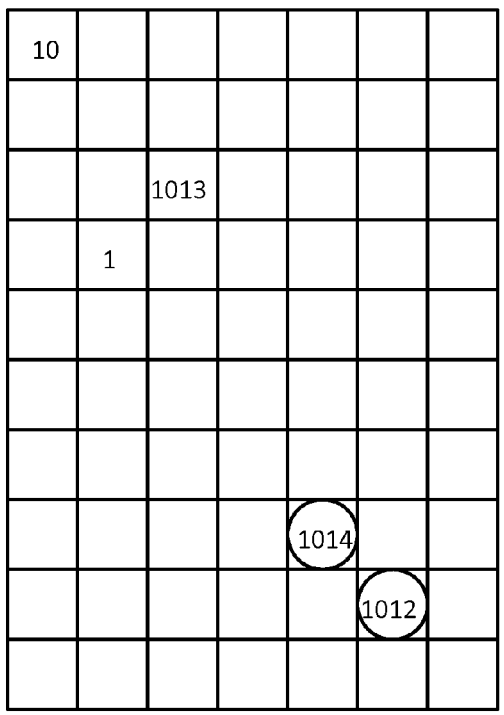

In step 140, the system determines the balance points for the image. Using the histograms and the band-specific white value thresholds calculated in step 130, the system identifies the pixel locations that have not only a single pixel value in one band above its corresponding threshold value, but pixel values for all of the bands each being over their corresponding threshold. An example of this process, as shown in FIGS. 2A-2C, the red, green and blue bands of image data, respectively, is illustrated with exemplary data. For the purpose of the example, it is assumed that the values of the band-specific white value thresholds were determined (from the corresponding histograms) to be 1015, 1000 and 1012, respectively. As can be seen from FIGS. 2A-2C, there are three pixels in each of the bands that have values greater than or equal to their band-specific white value thresholds. However, there are also cases in which only one or two bands have values above the threshold at a given spatial location. For example, the pixels of the upper left hand corner for each of the bands are such that the red pixel is at least as large as its band-specific white value threshold, but the values for the green and blue bands are below their thresholds. In these cases, this spatial location would not be included in the group of pixels used to perform additional processing of the white point calculation.

However, the circled pixel values indicate locations where the pixels from each of the bands are at least as large as their thresholds. As such, those pixels correspond to balanced white pixels that are to be used for additional processing. In step 150, having determined the locations for all the balanced white points, the system determines an average value for each band on a band-by-band basis. For example, the averages of the red, green and blue bands are (1020+1017)/2=1018, (1003+1000)/2=1001 and (1014+1012)/2=1013, respectively. As will be understood by those of ordinary skill in the art, there are typically a statistically significant number of points that will be determined to be balanced white points.

Having determined the average value for each band of the image that corresponds to a white pixel, the system determines which of the bands (e.g., red) has the highest average and utilizes that band as the primary band. The average "white" value for the primary band is then utilized to create a band-dependent correction factor for each of the remaining bands by calculating the amount of amplification needed to bring the other bands up to the same average white level as the primary band.

A number of different techniques can be utilized to calculate the band-dependent corrections factors. For example, in the simplest configuration, the correction factor for the green band would be (1018/1001)=1.017, and the correction factor for the blue band would be (1018/1013)=1.005. In an alternative embodiment, the correction factors may be based on more complex calculations, such as standard deviations. For example, the correction factor, $cf_{np}$ for a non-primary band may be calculated according to $cf_{np}=avg_{np}*(1+(2\ \sigma_{max}/avg_{np})$, where $\sigma_{max}$ is the maximum standard deviation of the "n" channels and $avg_{np}$ is the average "white" value for the corresponding band (e.g., 1001 and 1013 for green and blue, respectively).

Each of the pixel values of the non-primary bands would then be multiplied by its corresponding correction factor, and the resulting multiband image is then displayed and/or saved for later retrieval, viewing or processing.

In an alternate embodiment, in addition to performing a correction based on the white value thresholds, the system can perform the same identification for the band-specific black value thresholds and find the locations of the pixels that have values for all of the bands that are each below the corresponding black value threshold. In such an embodiment, the values that are below the corresponding black value thresholds can be averaged for each band as was done for the corresponding white value thresholds. The average values for each of the bands are then used as offsets that are initially removed from the pixel values of the corresponding bands before determining the primary band and creating the band-dependent correction factors. (Should the value for a pixel after removal of the corresponding average value be less than zero, the system can simply set the pixel value to zero before the corresponding correction factor is applied.) This process further stretches the dynamic range of the image information. In such a configuration, if the red, green and blue offsets were determined to be 4, 5 and 6, respectively, then, using an exemplary correction factor technique, the correction factors for the green and blue bands would be: ((1018−4)/(1001−5))=1.018, and the correction factor for the blue band would be ((1018−4)/(1013−6))=1.007, respectively. Moreover, since the dynamic range of the red is only 1014 out of 1024 (in a 10-bit example), all of the bands (red, green and blue) could further be multiplied by an additional stretching factor of 1024/1014=1.01. In light of the use of averages, any corrected values that overshoot the maximum (e.g., 1023) are set to the maximum.

The system for performing the series (100) of steps can be any combination of hardware and/or software configured to control the hardware. For example, the system may include digital computer memory for storing the instructions and/or image data that are used by processing circuitry that perform the steps described herein. The processing circuitry may include any one of, or a combination of: one or more processors (each with one or more cores), an applications specific integrated circuit (ASIC), a one-time programmable logic circuit, a reprogrammable logic circuit (e.g., GAL or FPGA), or a system on a chip (e.g., including a processor and memory on the same chip). In an embodiment where the image is to be displayed, the system preferably also includes a display and user input devices (e.g., mouse and/or keyboard).

The system may also be implemented as an interactive system such that files to be processed can be specified by a user interactively (e.g., from a menu of files stored on a file server or in a database). In such a configuration, the system may allow a user to select certain parameters (e.g., threshold levels for the histograms, the pre-filtering algorithm and the method of calculating the correction factor).

While certain configurations of structures have been illustrated for the purposes of presenting the basic structures of the present invention, one of ordinary skill in the art will appreciate that other variations are possible which would still fall within the scope of the appended claims.

We claim:

1. A system for processing a multiband image, comprising:
non-transitory digital computer memory for storing a multiband image having multiple bands of image data; and
processing circuitry for processing the multiband image, wherein the processing circuitry (a) determines pixel locations in the bands of the multiband image having values meeting a corresponding band-specific value threshold for each of the bands of the multiband image, (b) determines a corresponding band-specific correction factor for each of the visible bands of the multiband image based on the determined pixel locations, and (c) applies the corresponding band-specific correction factor to the respective visible bands of the multiband image to produce a corrected image,
wherein the values meet the corresponding band-specific value threshold if the values are above a corresponding band-specific white value threshold,
wherein the corresponding band-specific correction factor comprises a ratio of (1) the largest average of values at least as large as the corresponding band-specific white value threshold value to (2) the average of values at least as large as the corresponding band-specific white value threshold of the band to which the corresponding band-specific correction factor is to be applied.

2. The system as claimed in claim 1, wherein the processing circuitry further pre-filters the multiband image utilizing parameters captured contemporaneously with the capturing of the multiband image.

3. The system as claimed in claim 2, wherein the parameters are stored in the multiband image.

4. The system as claimed in claim 2, wherein the parameters are stored in a database separately from the multiband image.

5. The system as claimed in claim 1, further comprising circuitry for displaying the corrected image.

6. The system as claimed in claim 5, wherein the processing circuitry further receives a changed band-specific white value threshold, updates the multiband image based on the changed band-specific white value threshold and redisplays the corrected image generated based on the changed band-specific white value threshold.

7. A system for processing a multiband image, comprising:
non-transitory digital computer memory for storing a multiband image having multiple bands of image data; and
processing circuitry for processing the multiband image, wherein the processing circuitry (a) determines pixel locations in the bands of the multiband image having values meeting a corresponding band-specific value threshold for each of the bands of the multiband image, (b) determines a corresponding band-specific correction factor for each of the visible bands of the multiband image based on the determined pixel locations, and (c) applies the corresponding band-specific correction factor to the respective visible bands of the multiband image to produce a corrected image, wherein the values meet the corresponding band-specific value threshold if the values are below a corresponding band-specific black value threshold;

wherein the corresponding band-specific correction factor comprises a ratio of (1) the smallest average of values at most as large as the corresponding band-specific black value threshold value to (2) the average of values at most as large as the corresponding band-specific black value threshold of the band to which the corresponding band-specific correction factor is to be applied.

8. The system as claimed in claim 7, further comprising circuitry for displaying the corrected image.

9. The system as claimed in claim 8, wherein the processing circuitry further receives a changed band-specific black value threshold, updates the multiband image based on the changed band-specific black value threshold and redisplays the corrected image generated based on the changed band-specific black value threshold.

10. The system as claimed in claim 7, wherein the processing circuitry further pre-filters the multiband image utilizing parameters captured contemporaneously with the capturing of the multiband image.

11. The system as claimed in claim 7, wherein the processing circuitry further pre-filters the multiband image utilizing parameters captured contemporaneously with the capturing of the multiband image.

12. The system as claimed in claim 11, wherein the parameters are stored in the multiband image.

13. The system as claimed in claim 11, wherein the parameters are stored in a database separately from the multiband image.

14. A computer-implemented method for processing a multiband image having multiple bands of image data, the method comprising:

utilizing a processor and a non-transitory digital computer memory storing computer instructions to control the processor to perform the steps of:

determining pixel locations in the bands of the multiband image having values meeting a corresponding band-specific value threshold for each of the bands of the multiband image;

determining a corresponding band-specific correction factor for each of the visible bands of the multiband image based on the determined pixel locations; and applying the corresponding band-specific correction factor to the respective visible bands of the multiband image to produce a corrected image, wherein the values meet the corresponding band-specific value threshold if the values are above a corresponding band-specific white value threshold, wherein the corresponding band-specific correction factor comprises a ratio of the largest average of values at least as large as the corresponding band-specific white value threshold value to the average of values at least as large as the corresponding band-specific white value threshold of the band to which the corresponding band-specific correction factor is to be applied.

15. The method as claimed in claim 14, further comprising: pre-filtering the multiband image utilizing parameters captured contemporaneously with the capturing of the multiband image.

16. The method as claimed in claim 15, wherein the parameters are stored in the multiband image.

17. The method as claimed in claim 15, wherein the parameters are stored in a database separately from the multiband image.

18. The method as claimed in claim 14, further comprising displaying the corrected image.

19. The method as claimed in claim 18, further comprising: receiving a changed band-specific white value threshold, updating the multiband image based on the changed band-specific white value threshold and redisplaying the corrected image generated based on the changed band-specific white value threshold.

20. A computer-implemented method for processing a multiband image having multiple bands of image data, the method comprising:

utilizing a processor and a non-transitory digital computer memory storing computer instructions to control the processor to perform the steps of:

determining pixel locations in the bands of the multiband image having values meeting a corresponding band-specific value threshold for each of the bands of the multiband image;

determining a corresponding band-specific correction factor for each of the visible bands of the multiband image based on the determined pixel locations; and applying the corresponding band-specific correction factor to the respective visible bands of the multiband image to produce a corrected image, wherein the values meet the corresponding band-specific value threshold if the values are below a corresponding band-specific black value threshold, wherein the corresponding band-specific correction factor comprises a ratio of the smallest average of values at most as large as the corresponding band-specific black value threshold value to the average of values at most as large as the corresponding band-specific black value threshold of the band to which the corresponding band-specific correction factor is to be applied.

21. The method as claimed in claim 20, further comprising displaying the corrected image.

22. The method as claimed in claim 21, further comprising: receiving a changed band-specific black value threshold, updating the multiband image based on the changed band-specific black value threshold and redisplaying the corrected image generated based on the changed band-specific black value threshold.

* * * * *